United States Patent [19]

Lockerby et al.

[11] Patent Number: 4,614,006
[45] Date of Patent: Sep. 30, 1986

[54] APPARATUS FOR PROCESSING CRUSTACEANS

[76] Inventors: W. Lee Lockerby, 111 Hudlow Rd., Forest City, N.C. 28043; Alfred R. Guglielmo, 650 N. Ardenwood - Bldg. #5, Baton Rouge, La. 70806

[21] Appl. No.: 593,035

[22] Filed: Mar. 23, 1984

[51] Int. Cl.[4] .............................................. A22C 29/00
[52] U.S. Cl. ........................................... 17/71; 17/48
[58] Field of Search .............. 17/71, 48, 46; 220/408, 220/410; 206/387; 494/43

[56] References Cited

U.S. PATENT DOCUMENTS

| | | |
|---|---|---|
| 1,175,037 | 3/1916 | Yancey ................................... 17/71 |
| 1,520,190 | 12/1924 | Lieberman . |
| 1,565,342 | 12/1925 | Umrath ................................... 17/71 |
| 1,655,583 | 1/1928 | Umrath . |
| 2,104,027 | 1/1938 | Dubus . |
| 2,771,631 | 11/1956 | Hiller . |
| 3,229,325 | 1/1966 | Amelang . |
| 3,597,792 | 8/1971 | Lockerby . |
| 3,719,967 | 3/1973 | Craig . |

*Primary Examiner*—Donald R. Schran
*Assistant Examiner*—James L. Wolfe
*Attorney, Agent, or Firm*—Bell, Seltzer, Park & Gibson

[57] ABSTRACT

An apparatus for centrifugally removing meat from body sections of crabs or other crustaceans is disclosed, and which comprises a horizontally disposed disc having a plurality of separate crab body holders disposed in an equally spaced apart arrangement about the periphery of the disc. A direct current motor drive system is provided which is adapted to rapidly accelerate the disc to a desired rotational speed, and then rapidly brake the disc to a complete stop, in a very short period of time. The holders include individual receptacles for receiving the extracted meat, and which may be individually lifted from the disc to facilitate removal of the meat when the receptacles become full, and covers are provided for completely enclosing the crab bodies to eliminate possible misalignment from wind forces during rotation of the disc.

14 Claims, 6 Drawing Figures

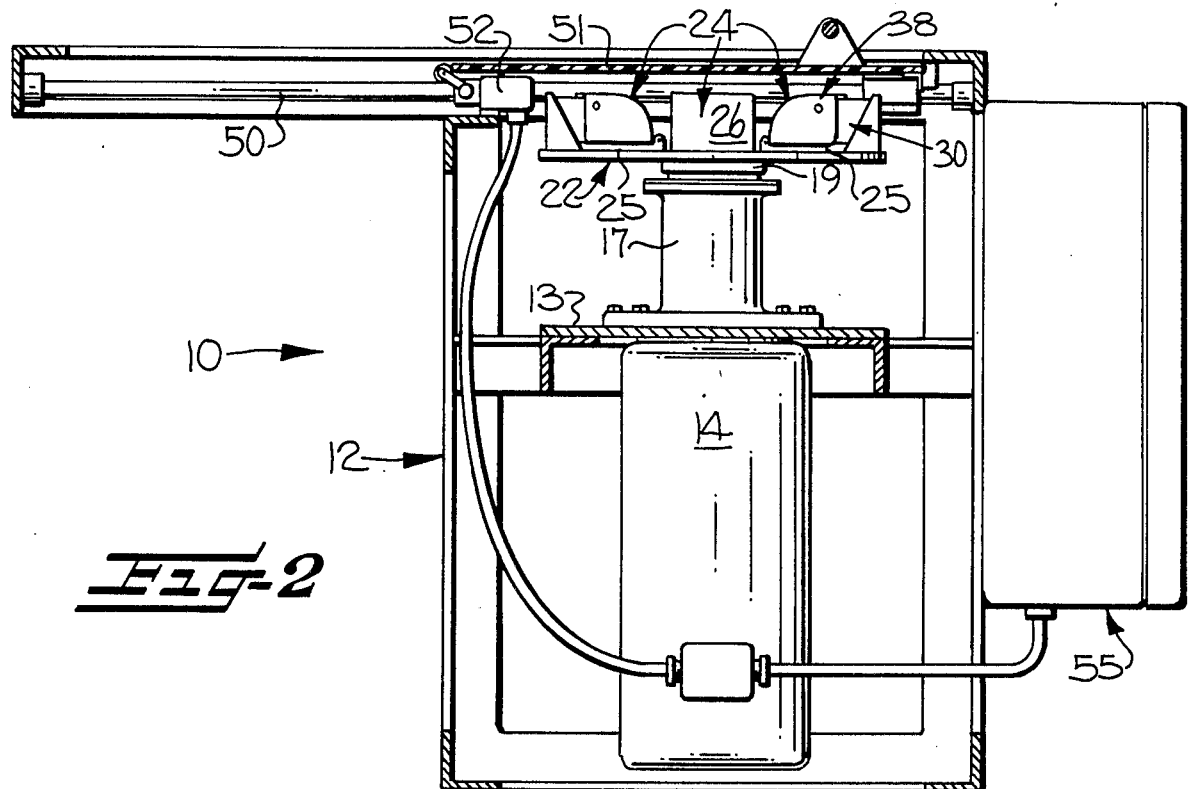
Fig-2
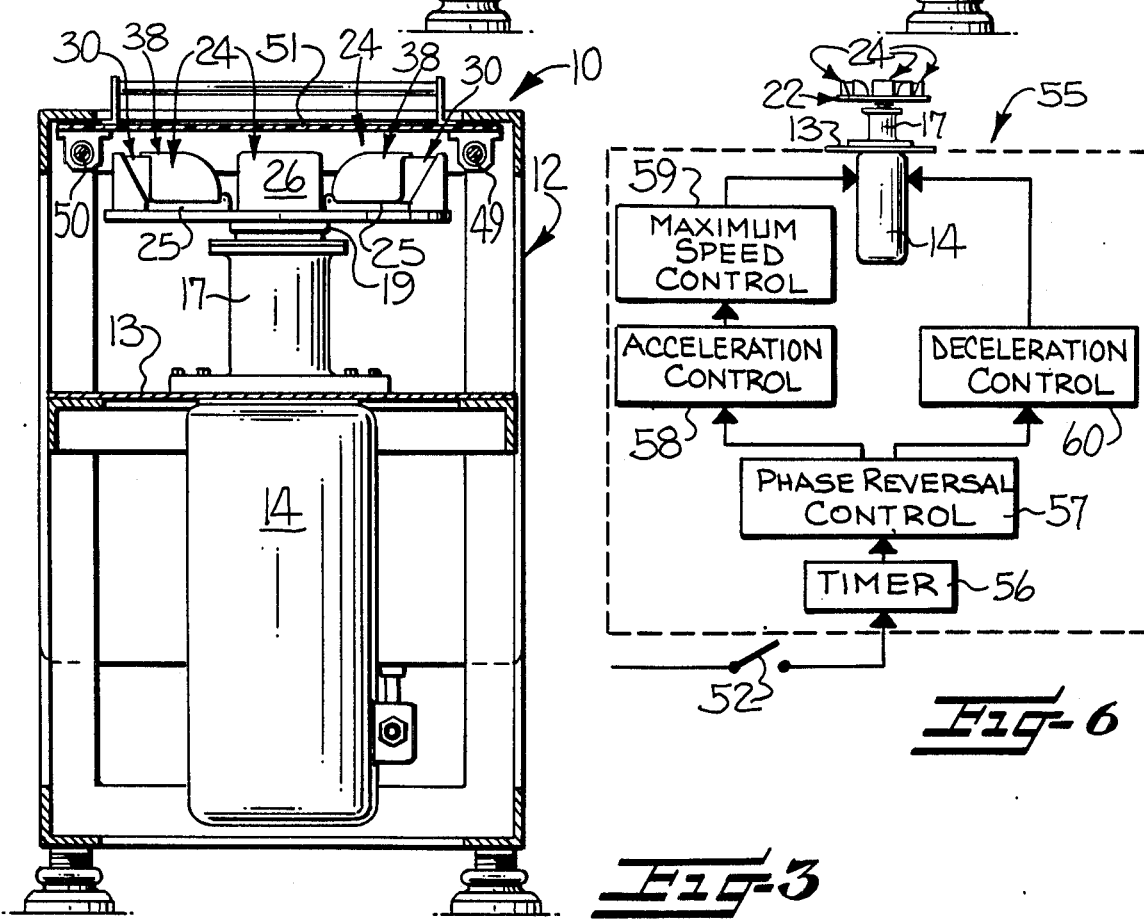
Fig-3
Fig-6

APPARATUS FOR PROCESSING CRUSTACEANS

The present invention relates to an apparatus for centrifugally removing meat from sliced body sections of crabs or other crustaceans.

The applicants' copending application Ser. No. 459,991, filed Jan. 21, 1983, now U.S. Pat. No. 4,503,586, discloses a method and apparatus for efficiently slicing crab bodies so that the meat therein may be more easily removed. More particularly, the crabs are initially cooked and the back shells are removed. The resulting bodies are then serially advanced along a processing apparatus which sequentially trims the claws and legs, cleans the bodies to remove the gills or other inedible material, and then slices the bodies longitudinally to form two half sections. The longitudinal slicing involves cutting longitudinally through the center portion of the crab bodies on opposite sides of the central body partition thereof and so as to remove the partition and open the half sections to their meat containing compartments.

The apparatus of the present invention is adapted to further process the crab body sections resulting from the above operations, by centrifugally removing the meat from the sections. Various prior devices have been proposed for centrifugally removing meat from crustaceans, note for example the prior U.S. Pat. Nos. 3,597,792; 2,104,027, and 1,520,190. However, these prior devices suffer from one or more limitations, including a complex and expensive structural arrangement, limited production capacity, difficulty in maintaining the components of the apparatus clean, the inability to hold the crab bodies in proper alignment for meat separation during rotational movement, and the inability to rapidly and efficiently remove the meat from a variety of crab species.

It is accordingly an object of the present invention to provide an apparatus for centrifugally removing meat from sliced crab bodies or the like, and which effectively alleviates the above-mentioned limitations and deficiencies of prior machines and processes of this general type.

It is a more specific object of the present invention to provide an apparatus of the described type which securely retains the sliced bodies in proper alignment during the centrifugal extraction operation.

It is a further object of the present invention to provide an apparatus of the described type which includes provision for efficiently collecting the extracted meat, and wherein the extracted meat may be readily removed from the apparatus after being extracted from the crab bodies to thereby improve production capacity.

It is still another object of the present invention to provide an apparatus of the described type which has the ability to selectively control the acceleration and final speed of the apparatus, to permit the apparatus to efficiently process a variety of crab species.

These and other objects and advantages of the present invention are achieved in the embodiment illustrated herein by the provision of an apparatus which comprises a supporting frame, and a horizontally disposed disc rotatably mounted to the frame. A plurality of separate holders are fixedly mounted to the disc in an equally spaced apart arrangement about the periphery of the disc, and each of the holders is adapted to releasably support an individual cup-like receptacle which has an open top, and with the receptacle being supported so that the open top faces radially inwardly. Also, the receptacle may be vertically lifted and separately removed from such operative position.

Each holder further includes a body receiving area disposed radially inwardly from the associated receptacle, and openwork barrier means in the form of a row of upright pins disposed between the body receiving area and the associated receptacle. The apparatus further includes drive means for rapidly accelerating the disc to a rotational speed adapted for centrifugally extracting meat from sliced crab bodies or the like, and which are positioned in the holders so as to contact the radially inner side of the row of pins. By this arrangement, the forces exerted on the crab bodies during acceleration and rotation of the disc causes the meat to be extracted from the bodies and pass through the row of pins and into the removable receptacles.

In the preferred embodiment of the invention as illustrated herein, the drive means includes an electric direct current motor, and control means by which the polarity of the motor may be reversed after the predetermined speed is reached, so that the motor is converted to a regenerative mode which acts to rapidly brake the disc to a complete stop. Also, in the preferred embodiment each of the holders comprises a cover which is pivotally mounted to the disc, with the cover being pivotable to a closed position substantially overlying the area receiving the sliced crab bodies to thereby protect the crab bodies from wind forces during rotation of the disc which tend to upset the alignment of the bodies which is necessary for complete meat extraction.

Some of the objects having been stated, other objects and advantages of the invention will appear as the description proceeds, when taken in connection with the accompanying drawings, in which FIG. 1 is a partially sectioned perspective view of an apparatus embodying the features of the present invention;

FIG. 2 is a sectional side elevation view of the apparatus shown in FIG. 1 together with an electrical control box mounted at one end of the apparatus;

FIG. 3 is a sectional end elevation view of the apparatus shown in FIG. 1;

FIG. 6 is a schematic representation of the drive control for the electric motor of the apparatus.

Figure 1:
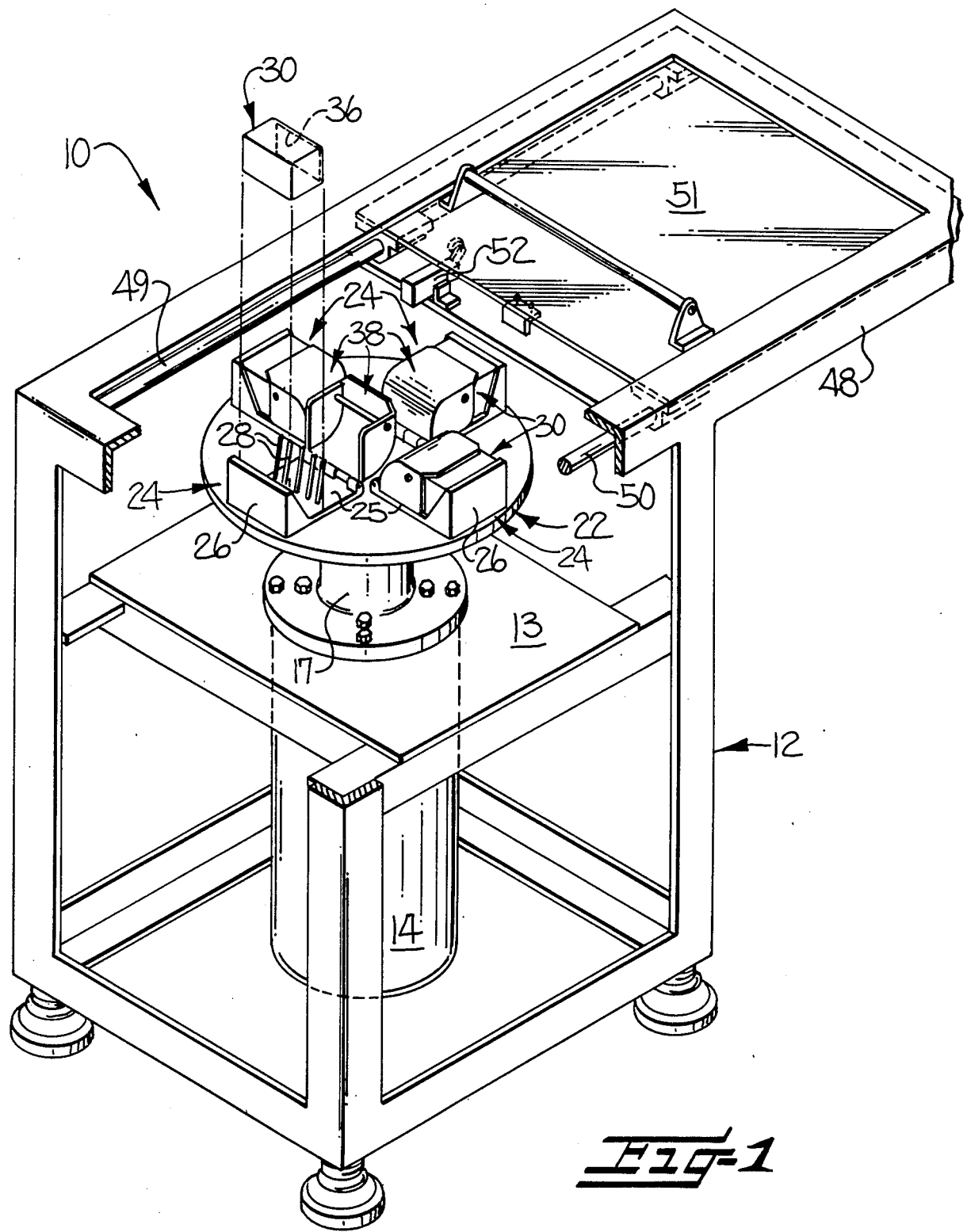

Referring more particularly to the drawings, an apparatus which embodies the features of the present invention is indicated generally at 10. The apparatus comprises a supporting, box-like frame 12, which includes a horizontal mounting plate 13. An electric direct current motor 14 is mounted to the plate 13, with the output shaft 15 of the motor extending vertically through the plate 13 in the manner best seen in FIG. 4. The output shaft 15 is fixed to an intermediate shaft 16 which is rotatably mounted in the housing 17 by means of the bearings 21, and the upper end 18 of the intermediate shaft is threaded. A transverse flange 19 is threaddedly received on the upper threaded end 18, and a lock nut 20 is provided for releasably locking the flange 19 to the shaft 16.

The apparatus 10 further includes a horizontally disposed disc 22 which is bolted to the flange 19, and so that the rotation of the motor 14 is transmitted to the disc 22. The disc 22 comprises a circular metal plate, having a diameter which typically measures about 18 inches. A total of four separate holders 24 are fixedly mounted to the disc in an equally spaced apart arrangement about the periphery of the disc. Each of the holders 24 includes a bottom plate 25 which is bolted to the disc 22, and an upright support wall 26 disposed at the radially outer edge of the holder, with the wall 26 extending in a direction perpendicular to a radial line on the disc. An inwardly extending side edge wall 27 is mounted at each end of the support wall 26.

Figure 4:
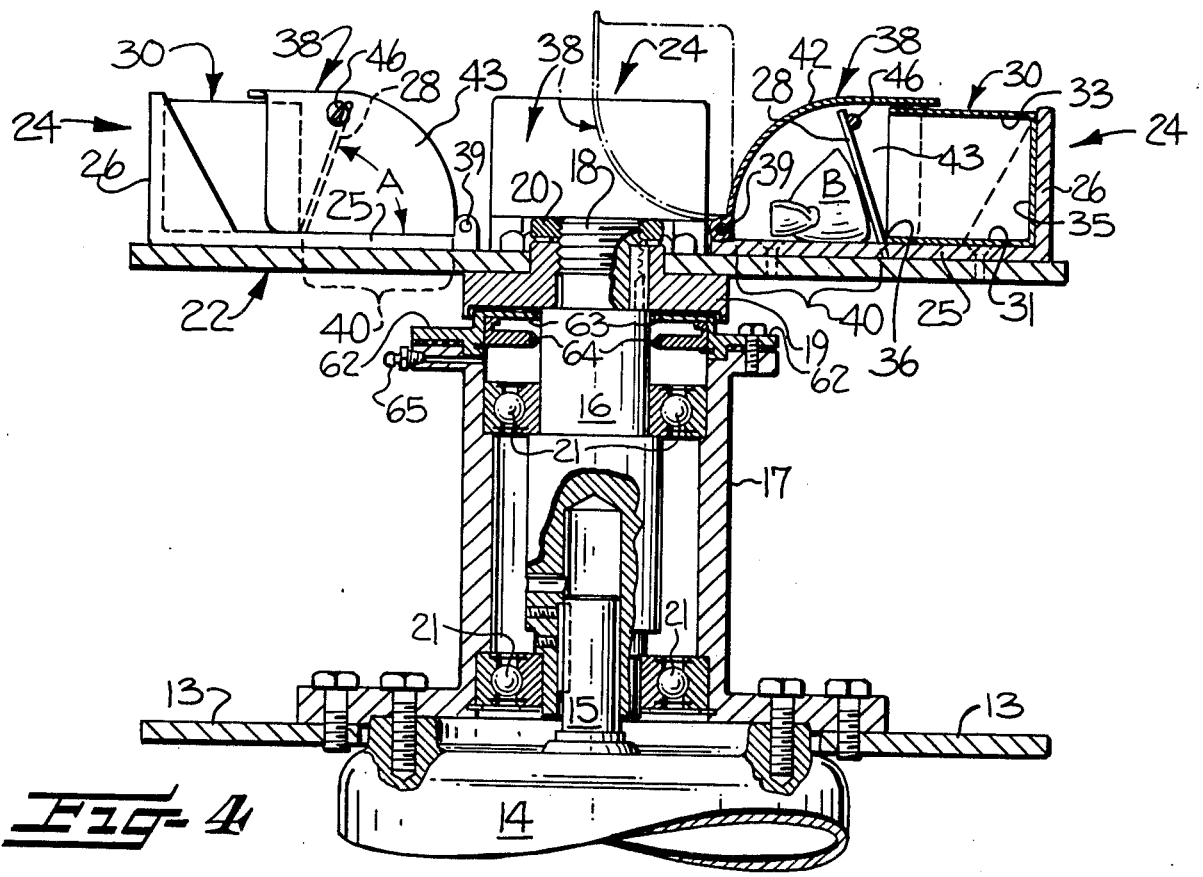
FIG. 4 is a sectional side elevation view of the mounting arrangement for the disc of the apparatus shown in FIG. 1.

Each of the holders further includes openwork barrier means in the form of a plurality of upright pins 28 which are mounted to the bottom plate 25 in spaced relation along a row disposed perpendicular to a radial line on the disc, with the row of pins 28 being located radially inwardly from the upright support wall 26. As best seen in FIG. 4, the upright pins 28 are inclined from the vertical in a direction toward the rotational axis of the disc, and so as to form an acute angle A with the portion of the bottom plate 25 inside of the pins. Typically, the angle A measures between about 60° to 80°.

The apparatus further includes a plurality of individual cup-like receptacles 30 having a rectangular box-like configuration. More particularly, each receptacle includes parallel opposite end walls 31, 32 and parallel opposite side walls 33, 34, a closed bottom 35, and an open top 36. Further, each receptacle 30 is sized so that it may be closely received in an operative position between the upright support wall 26 and the pins 28, and between the side edge walls 27, with the open top 36 facing radially inwardly and toward the pins. Further, and as best seen in FIG. 5, the receptacle 30 may be vertically lifted and separately removed from its operative position.

Each holder 24 further comprises a cover 38 which is pivotally mounted to the bottom plate 25, and thus the disc 22, by means of a hinge 39 having an axis which is located radially inwardly from the row of pins 28 a predetermined distance, with the axis of the hinge 39 extending generally parallel to the direction of the row of pins. Thus a crab body receiving area 40 is defined between the row of pins 28 and the axis of the hinge 39.

Figure 5:
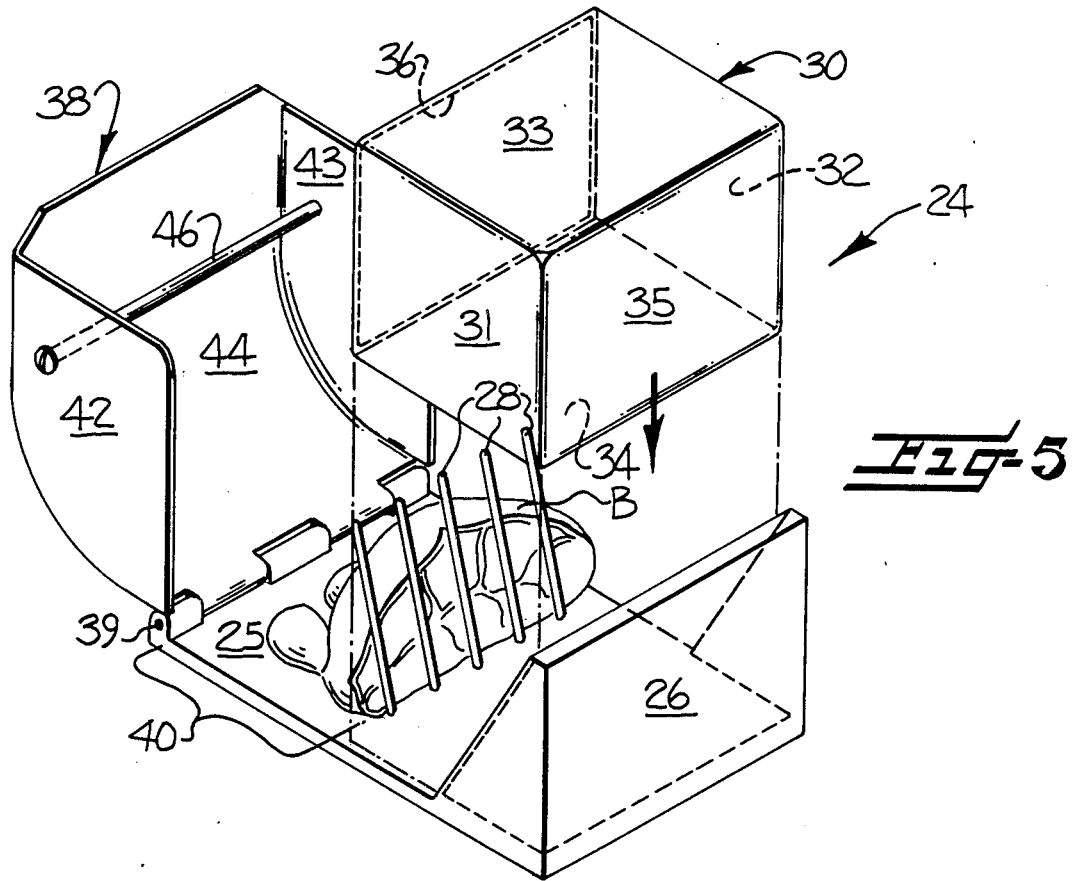
FIG. 5 is an enlarged exploded perspective view of one of the crab body holders of the apparatus shown in FIG. 1.

The cover 38 comprises parallel opposite end walls 42, 43 and a curved top wall 44 which extends between the end walls, and the cover is pivotable between an open or raised position shown in FIG. 5 wherein the body receiving area 40 is open to permit a crab body B or the like to be vertically received therein, and a closed or lowered position as seen in FIG. 4 wherein the cover substantially overlies and encloses the body receiving area. In addition, the end walls 42, 43 and curved top wall 44 of the cover are sized and configured so as to enclose the end walls 31, 32 and upper side wall 33 of the associated receptacle 30 when the receptacle is disposed in its operative position, and the cover is closed. Thus in the closed position of the cover, it will be seen that the crab body B in the area 40 is entirely enclosed, to thereby protect the body from wind forces during rotation of the disc and which would tend to deflect the body from its alignment with the row of pins. It will also be seen that the cover will be held in the closed position by centrifugal force when the disc is rotated, and the end walls 42, 43 will tightly contact the bottom plate 25 to form a generally water tight seal.

Each cover 38 further includes a rod 46 extending between the end walls 42, 43 thereof, with the rod 46 being located so as to be disposed immediately adjacent the radially back side of the row of pins 28, and adjacent the upper ends thereof when the cover is disposed in the closed position, and so that the rod 46 reinforces the pins against the centrifugal forces exerted by the crab bodies or the like during rotation of the disc. In view of the high rotational speed achieved by the disc and holders as further described below, it is preferred that the disc and holders be dynamically balanced to assure vibration-free operation.

The supporting frame 12 of the apparatus will be seen to substantially enclose the motor 14 and disc 22, and it will be understood that the upper portion of the frame preferably includes covering side panels (not shown) which are provided for safety purposes. In addition, the supporting frame 12 includes a lateral extension 48 at the upper portion thereof, with the extension mounting a pair of rods 49, 50 for slideably supporting a protective cover 51 of non-breakable glass or other suitable material. A switch 52 is mounted to the frame 12 which controls the operation of the motor 14, with the switch being closed only when the cover 51 is moved to the operative position immediately above the disc as shown in FIG. 2, and as further described below.

The apparatus 10 of the present invention further comprises drive means mounted on the support frame for rapidly accelerating the disc to a predetermined rotational speed so as to be adapted to centrifugally extract meat from the sliced crab bodies B or the like which are positioned in the holders 24 in contact with the radially inner side of the row of pins 28, and with the extracted meat passing through the row of pins and into the receptacles 30. This drive means includes the direct current motor 14 as described above, and a motor control 55 as schematically illustrated in FIG. 6. More particularly, the motor control includes an adjustable timer 56, and a phase reversal relay 57 which is actuated when the timer times out to reverse the polarity of the motor 14 and cause the motor to convert to its regenerative mode to electrically brake the disc 22 to a stop. The motor control also includes an acceleration control 58, an adjustable maximum speed control 59, and a deceleration control 60.

The motor 14 should have sufficient power to rapidly accelerate the disc 22 to its selected maximum speed, which typically is about 1750 to 2000 rpm, and then electrically brake the disc to a stop at an equally rapid deceleration rate. In this regard, it is believed that the acceleration of the disc is often times more critical than the final speed in removing the meat, since a rapid acceleration is able to "jerk" the meat from the several compartments in the crab body, and thus acceleration is able to remove a great deal of meat which cannot be removed by centrifugal force alone. For this reason, the acceleration control 58 is set at a maximum acceleration rate, but which is not so high as to cause the shells of the species of crabs being processed to break. For example, Dungeness crabs which are indigenous to the West coast have a relatively pliable shell, and can withstand a relatively high acceleration rate without breakage, whereas the Blue crabs which are found on the East coast have a relatively brittle shell which tends to break at higher acceleration rates.

The acceleration control 58 and the deceleration control 60 are of conventional design, and the acceleration control 58 permits the time of acceleration to the predetermined maximum speed to be varied, and the deceleration control permits the time of deceleration from the maximum speed to a stopped condition to be varied. As will be understood, a rapid deceleration is desirable to shorten the overall cycle time and thus permit increased production. A suitable regenerative direct current motor control of the described type is manufactured by Seco Electronics of Lancaster, S.C.

As best seen in FIG. 4, the mounting of the disc 22 to the shaft 16 is designed to prevent water which may be present on the disc from reaching the bearings 21. In this regard, the upper end of the housing 17 mounts a seal cap 62 which is bolted thereto, and the seal cap 62 includes a radial flange 63 which entends to a point closely adjacent the shaft 16. Also, a lip seal 64 having a resilient inner edge is mounted to the seal cap 62 by a force fit or the like, and the inner edge of the lip seal contacts the shaft 16 so as to prevent the passage of water to the upper bearing 21. The space between the radial flange 63 and the upper bearing 21 is preferably filled with grease by means of the nipple 65, to further resist the passage of water. By this arrangement, it is nearly impossible for any water associated with the crab bodies on the disc to reach the bearings 21.

To now describe the operation of the illustrated embodiment, the apparatus is initially loaded by withdrawing the cover 51 to the position shown in FIG. 1, which acts to open the switch 52 and disconnect the drive motor. The covers 38 of the four holders 24 are then lifted, and one or possibly more crab body sections B are positioned in the receiving area 40 of each holder, with the sliced open side of each body section being disposed against the row of pins 28. The covers 38 are then closed, and the cover 51 is moved to its operative position overlying the disc. Upon the cover 51 reaching its operative position, the switch 52 closes, which acativates a cycle of operation for the apparatus.

Specifically, upon closure of the switch 52, the motor accelerates at the rate established by the acceleration control 58, to the selected speed. As described above, the selected acceleration and final rotational speed are determined to achieve most efficient meat removal, without shell breakage, for the particular species being processed. For most crab species, it is desirable that the disc be accelerated at a rate of at least about eight revolutions per second per second, for a period of two to four seconds, which will result in the meat being essentially entirely extracted. In the case of crab species having stronger shells, it is preferred that the disc be accelerated at a higher rate, such as about 16 revolutions per second per second, for between about two to four seconds.

As a specific example, the apparatus may include a direct current motor 14 having a 7 and ½ horsepower rating, and the disc 22 may measure 18 inches in diameter, with the row of pins being spaced about 5 and ½ inches from the rotational axis of the disc. Assuming Dungeness crabs are being processed, the maximum rotational speed may be set to about 1800 rpm (i.e. 30 rev/sec), and the acceleration rate set at about two seconds (i.e. 15 rev/sec/sec), with the deceleration rate being set at the same time period. The timer 56 is set at about two seconds, so that the relay 57 reverses the motor polarity to commence deceleration immediately upon the motor reaching its maximum speed. Thus in operation, the disc may be accelerated to its predetermined maximum speed, and braked to a full stop, in about four seconds.

The acceleration and centrifugal forces act to press the crab bodies B against the row of pins 28, with the extracted meat moving through the row of pins and into the receptacles 30. In this regard, the angled orientation of the pins 28 serves to wedge the bodies between the pins and the bottom plate 25, to further hold the bodies in proper alignment during the cycle of operation.

Upon completion of the cycle of operation, the cover 51 is withdrawn to the position shown in FIG. 1, and the covers 38 are pivoted upwardly to permit removal of the empty shells. Usually, several cycles may be run before the receptacles 30 become full, at which time they are removed and replaced with empty receptacles. The body receiving areas 40 are then again loaded with crab body sections, and the process is repeated.

In the drawings and specification there has been set forth a preferred embodiment of the invention, and although specific terms are employed, they are used in a generic and descriptive sense only and not for purposes of limitation.

That which is claimed is:

1. An apparatus for centrifugally removing meat from sliced crab bodies or other crustaceans, and comprising a supporting frame, a horizontally disposed disc rotatably mounted to said frame, a plurality of individual cup-like receptacles each having an open top, a plurality of separate fixedly mounted to said disc in an equally spaced apart arrangement about the periphery of said disc, each of said holders including means releasably supporting an individual one of said receptacles in an operative position with its open top facing radially inwardly and such that the receptacle may be vertically lifted and removed from such operative position, a body receiving area disposed radially inwardly from the associated receptacle when the receptacle is disposed in its operative position, and openwork barrier means disposed between said body receiving area and the associated receptacle, and a cover mounted to said disc for pivotal movement between an open position to permit a sliced crab body or the like to be vertically received in said body receiving area, and a closed position enclosing said body receiving area and the open top of the associated cup-like receptacle when said receptacle is positioned in said operative position, and drive means mounted to said supporitng frame for rapidly accelerating said disc to a predetermined rotational speed and so as to be adapted to extract meat from sliced crab bodies or the like which are positioned in said body receiving area of said holders and in contact with the radially inward side of said openwork barrier means, and such that the extracted meat passes through said barrier means and is received in the removable receptacles.

2. The apparatus as defined in claim 1 wherein each of said receptacles is of rectangular outline and includes parallel opposite end walls and parallel opposite side walls, and wherein each of said covers comprises parallel opposite end walls and a top wall extending therebetween, with the end walls and a top wall of said cover being configured to closely enclose the end walls and upper side wall of the associated receptacle when the receptacle is disposed in its operative position and said cover is closed.

3. The apparatus as defined in claim 2 wherein said barrier means comprises a plurality of upright pins mounted in spaced relation along a row disposed perpendicular to a radial line on said disc, and said upright pins are inclined from the vertical in a direction toward the rotational axis of said disc when the holder is viewed in radial cross section, and so as to form an acute angle with the bottom wall of the body receiving area.

4. The apparatus as defined in claim 3 wherein said cover includes a rod extending between said end walls thereof, with the rod being located so as to be disposed immediately adjacent the radially back side of said row of pins and adjacent the upper ends of said pins when said cover is closed so as to reinforce said pins against the centrifugal forces exerted by the crab bodies or the like during rotation of said disc.

5. The apparatus as defined in claim 1 wherein said drive means includes an electric direct current motor, and control means for selectively adjusting the acceleration and the final rotational speed of said motor.

6. The apparatus as defined in claim 5 wherein said control means further comprises means for selectively reversing the polarity of the power input to provide regenerative braking of said motor.

7. The apparatus as defined in claim 1 wherein said supporting frame includes a housing substantially enclosing the periphery of said disc, and a cover plate slideably mounted to said supporting frame for movement between an operative position protectively overlying said disc and a laterally withdrawn inoperative position.

8. The apparatus as defined in claim 7 wherein said drive means further includes safety switch means for permitting operation of said motor only when said cover plate is disposed in its operative position.

9. The apparatus as defined in claim 1 wherein said cover of each holder is pivotally mounted to said disc along an axis which is perpendicular to a radial line on said disc and which is disposed radially inwardly from said body receiving area, and whereby the cover is lifted to said open position and lowered to said closed position.

10. The apparatus as defined in claim 1 wherein said barrier means of each of said holders is located at least about 5 and ½ inches from the axis of rotation of said disc, and said drive means is adapted for accelerating said disc at a rate of at least about eight revolutions per second per second.

11. The apparatus as defined in claim 10 wherein said drive means includes a direct current motor, adjustable timer means, and means operatively controlled by said timer means for reversing the polarity of said motor to rapidly brake the rotation of said disc.

12. The apparatus as defined in claim 11 wherein said drive means is adapted to accelerate said disc to a predetermined rotational speed of at least about 30 revolutions per second.

13. The apparatus as defined in claim 1 wherein said means releasably supporting an individual one of said receptacles on each holder comprises an upright support wall disposed at the radially outer edge of such holder, and an inwardly directed side edge wall at each end of said upright support wall so as to be adapted to closely receive the receptacle in its operative position therebetween.

14. The apparatus as defined in claim 1 wherein said drive means includes an electric motor having output shaft means, with said disc being fixed to the free end of said output shaft means, a housing fixed to said supporting frame and enclosing said output shaft means, bearing means interposed between said output shaft means and said housing, and sealing means interposed between said output shaft means and said housing on one side of said bearing means for precluding the passage of water to said bearing means.

* * * * *

UNITED STATES PATENT AND TRADEMARK OFFICE
CERTIFICATE OF CORRECTION

PATENT NO. : 4,614,006

DATED : September 30, 1986

INVENTOR(S) : W. Lee Lockerby and Alfred R. Guglielmo

It is certified that error appears in the above-identified patent and that said Letters Patent is hereby corrected as shown below:

Line 29, Column 6, after the word "separate" insert
-- holders --.

Signed and Sealed this

Sixteenth Day of December, 1986

Attest:

DONALD J. QUIGG

*Attesting Officer*  *Commissioner of Patents and Trademarks*